United States Patent
Cortright et al.

(10) Patent No.: US 7,189,470 B2
(45) Date of Patent: Mar. 13, 2007

(54) SEALING MATERIALS AND DEVICES UTILIZING SUCH MATERIALS

(75) Inventors: Jeffrey E Cortright, Corning, NY (US); Lisa A Lamberson, Painted Post, NY (US); Pamela A Maurey, Savona, NY (US); Robert M Morena, Lindley, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 11/038,921

(22) Filed: Jan. 18, 2005

(65) Prior Publication Data

US 2006/0160690 A1   Jul. 20, 2006

(51) Int. Cl.
*H01M 2/08* (2006.01)

(52) U.S. Cl. ............... 429/35; 501/17; 501/18; 501/21; 501/32; 501/68; 501/69; 501/72

(58) Field of Classification Search ............... 501/14, 501/17, 18, 21, 32, 55, 68, 69, 72; 429/30, 429/35
See application file for complete search history.

(56) References Cited

U.S. PATENT DOCUMENTS

| | | | | |
|---|---|---|---|---|
| 4,946,622 A | * | 8/1990 | Kiss et al. | 252/301.4 F |
| 5,273,837 A | * | 12/1993 | Aitken et al. | 429/30 |
| 5,308,803 A | * | 5/1994 | Clifford et al. | 501/17 |
| 6,291,092 B1 | | 9/2001 | Kohli et al. | 429/33 |
| 2005/0277541 A1 | * | 12/2005 | Yoshii et al. | 501/26 |

FOREIGN PATENT DOCUMENTS

| JP | 2001319670 A | * | 11/2001 |
|---|---|---|---|
| WO | WO2003/007400 A | * | 1/2003 |
| WO | WO2004/031088 A | * | 4/2004 |

* cited by examiner

*Primary Examiner*—David Sample
(74) *Attorney, Agent, or Firm*—Svettana Z. Short

(57) ABSTRACT

A solid oxide fuel cell device incorporates a sealing material resistant to hydrogen gas permeation at a sealing temperature in the intermediate temperature range of 600° C.–800° C., the seal having a CTE in the $100\times10^{-7}$/° C. to $120\times10^{-7}$/° C., wherein the sealing material comprises in weight %, of: (i) a 80 to 95 wt % of glass frit, the glass frit itself having a composition in mole percent of: $SiO_2$ 70–85%; $Al_2O_3$ 0–5%; $Na_2O_3$ 0–8%; $K_2O$ 10–25%; $ZnO$ 0–10%; $ZrO_2$ 0–6%; $MgO$ 0–7%; $TiO_2$ 0–2%; and (ii) and 5 wt % to 25 wt % of addition comprising at least one of: alumina, zirconia or leucite.

6 Claims, 3 Drawing Sheets

SEALING MATERIALS AND DEVICES UTILIZING SUCH MATERIALS

BACKGROUND OF THE INVENTION

1. Field of the Invention

The present invention relates generally to glass sealing frits such as alkali-zinc-silicate frits, and seals and devices utilizing such frits. More specifically, these frits and sealing materials are suitable as sealing frits in solid oxide fuel cells (SOFC).

2. Technical Background

Frits which seal in the temperature range of 600° C. to 1000° C. represent an intermediate class of materials between the $B_2O_3$ or $P_2O_5$ based frits used for low temperature sealing of many commercial glass products and the diverse number of silicates utilized for high temperature joining of advanced ceramic, structural components.

The low temperature frits are used at temperatures below 600° C. for sealing products such as cathode ray tubes (CRT), light bulbs and the like. The high temperature frits are used at temperatures above 1000° C. to produce articles which may embody high temperature, fiber reinforced, structural ceramics.

A very old product in the intermediate temperature range (600° C. to 1000° C.) of sealing is ZnO—$B_2O_3$—$SiO_2$ frit. Another is $Li_2O$—modified ZnO—$Al_2O_3$—$SiO_2$ frit designed for use between 900° C. to 1000° C. Frits that seal in the range of 600° C. to 800° C. are important for many applications. The need for such frits became evident through requests for sealant frits for solid Oxide fuel cells (SOFC).

Furthermore, fuel cell devices undergo large thermal cycling and large thermal gradients, which induces thermal stresses in the fuel cell stack components. Thus the seals need to be able to withstand high temperature fluctuations and have expansion coefficients compatible with electrolyte sheets and frames. If the seal will expand at a rate that is different from the thermal expansion rate of the frame or the electrolyte sheet, it may either crack or cause cracking of the electrolyte sheet. A defect in either the seal or the electrolyte sheet may necessitate a replacement of the electrolyte device.

U.S. Pat. No. 6,291,092 describes the $B_2O_3$—free-frit seals suitable for use in solid oxide. These frit seals had been successfully used in many applications. However, some of the fuel cell devices utilize steel components (e.g., frames or substrates). The frit seals disclosed in Table 1 of U.S. Pat. No. 6,291,092 contain relatively high amounts of ZnO, a compound that could be reduced under appropriate conditions by redox reaction with many stainless steel alloying elements such as Cr and Al.

Thus the need to have alternative frit seal compounds for solid oxide fuel cells has been the subject of considerable amount of research in recent years.

SUMMARY OF THE INVENTION

One advantage of the sealing material of the present invention is that it seals fuel cell device components at temperature ranges (700–900° C.) while having CTEs that are compatible with the CTEs of these components. Another advantage of the sealing material of the present invention is that the resultant seals are durable in the SOFC environments.

According to one aspect of the present invention a solid oxide fuel cell device incorporates a sealing material resistant to hydrogen gas permeation at a sealing temperature in the intermediate temperature range of 600° C.–800° C., the seal having a CTE in the range of $100\times10^{-7}/°$ C. to $120\times10^{-7}/°$ C., wherein the sealing material comprises in weight %, of:

(i) a 80 to 95 wt % of glass frit, the glass frit itself having a composition in mole percent of: $SiO_2$ 60–80; $Al_2O_3$ 1–3; $Na_2O_3$ 0–8; $K_2O$ 10–20; ZnO 0–10; $ZrO_2$ 0–6; MgO 0–7; $TiO_2$ 0–2; and (ii) an alumina mill, zirconia or leucite addition 5 wt % to 25 wt %.

According to another aspect of the present invention a solid oxide fuel cell device sealing material comprises frit glass in weight %, of: $SiO_2$ 60–80; $Al_2O_3$ 1–3; $Na_2O_3$ 0–8; $K_2O$ 10–20; ZnO 0–10; $ZrO_2$ 0–6; MgO 0–7; and $TiO_2$ 0–2. According to the embodiment of the present invention this frit glass, when mixed with filler and then fired, forms a seal that is resistant to hydrogen gas permeation at a sealing temperature in the intermediate temperature range of 600° C.–800° C., the seal having a CTE in the $100\times10^{-7}/°$ C. to $120\times10^{-7}/°$C.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present exemplary embodiments of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention and together with the description serve to explain the principles and operations of the invention.

DETAILED DESCRIPTION OF THE PREFERRED EMBODIMENTS

Figure 1:
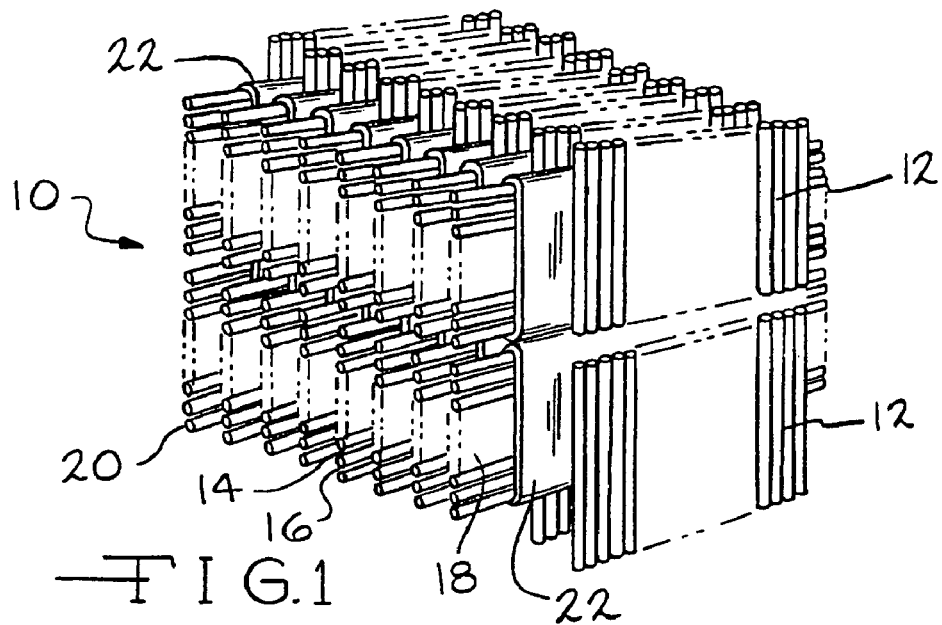
FIG. 1 is a schematic perspective view of an exemplary solid oxide fuel cell device assembly.

Reference will now be made in detail to the present preferred embodiments of the invention, examples of which are illustrated in the accompanying drawings. Whenever possible, the same reference numerals will be used throughout the drawings to refer to the same or like parts. Three exemplary embodiments of the inorganic electrolyte sheet of the present invention is shown schematically in FIG. 1. The fuel cell device is designated generally throughout by the reference numeral 10.

Figure 2:
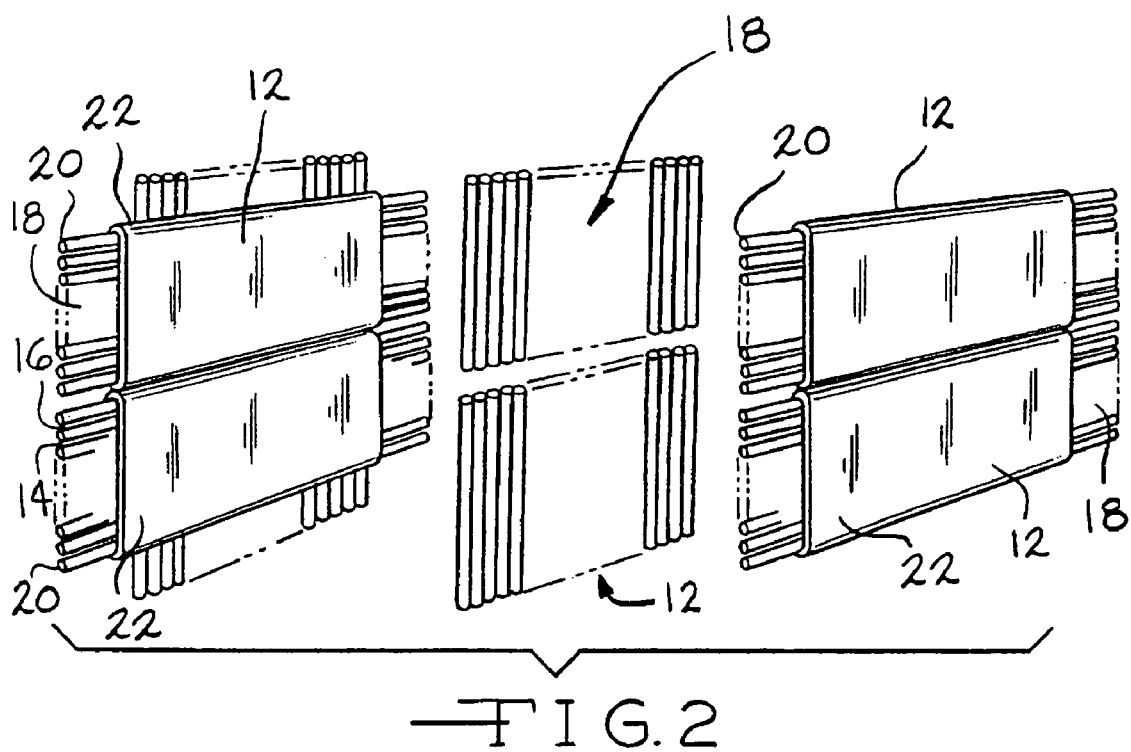
FIG. 2 is an exploded, perspective view of a portion of the solid oxide fuel cell device assembly of FIG. 1.

FIG. 1 is a perspective view of a typical SOFC device assembly 10. FIG. 2 illustrates a portion of the fuel cell device assembly 10, including stacked fuel cell devices 12. The SOFC device assembly 10 includes alternating fuel cell devices, each composed of layers of a solid electrolyte, cathode and anode plates. The solid electrolyte generally is yttrium (Y)-doped $ZrO_2$. Fuel cell devices 12 include anodes 14, cathodes 16 and an electrolyte (not shown). Each fuel cell device 12 also comprises distribution member 18 which embodies a plurality of parallel passages 20 for the supply of electrolyte, oxidant or fuel. The axes of passages 20 lie in a common plane.

Distribution member 18 is preferably manufactured from two corrugated, ceramic plates. The corrugations of the plates are arranged parallel, and the troughs of one of the plates are bonded to the peaks of the other plate. This forms passages 20 which have a diameter on the order of 2 mm.

As shown in FIG. 2, porous support structure 22 surrounds and extends transversely of distribution member 18. It contacts the peaks and the troughs of member 18 to form a plurality of parallel passages which are anode 14 or cathode 16 chambers of solid oxide fuel cell devices 12. They provide the distribution and removal of the electrolyte for solid oxide fuel cell devices 12. The corrugated ceramic plates have apertures between passages 20 to allow fuel to flow from passages 20 into anode 14 or cathode 16 chambers of solid oxide fuel cell devices 10.

Figure 3:
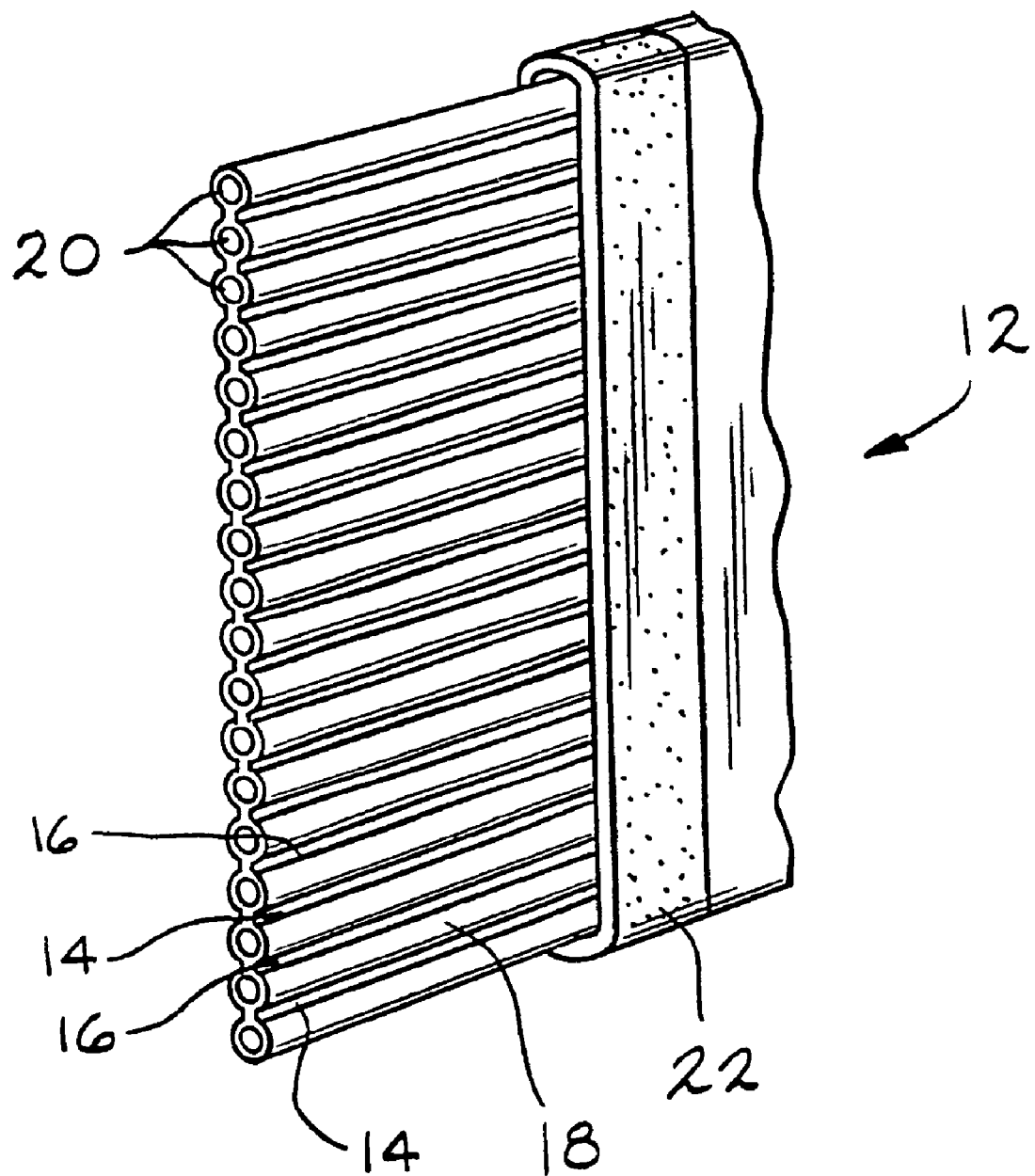
FIG. 3 is a perspective view of an exemplary fuel cell device.

FIG. 3 is an exploded, fragmentary view showing alternating anodes 14 and cathodes 16 and their relationship to passages 20.

The glass-frit-based seals of this invention may encapsulate each cell 12, or they may form a barrier between each cell 12, a group of cells, or a component incorporating one or more cells 12. When forming a barrier, the glass-frit-based seals may take the form of a plate sandwiched between adjacent cells 12. Structure 22 also may be made of the glass frits of this invention. The glass-frit-based seals prevent hydrogen gas from diffusing from one cell 12 (or a group of cells) to another. The glass-frit-based seals may be used in SOFC devices with different architecture than that shown in FIGS. 1–3, any place where one or more SOFC device components need to be sealed to another component.

According to an embodiment of the present invention the solid oxide fuel cell device 10 incorporates a sealing material resistant to hydrogen gas permeation at a sealing temperature in the intermediate temperature range of 600° C.–800° C. The sealing material has a CTE in the $100 \times 10^{-7}/°$ C. to $120 \times 10^{-7}/°$ C. The sealing material comprises sealing glass frit in 75 to 95 (preferably 80 to 90) weight % and mill addition, for example an alumina mill, zirconia mill or leucite mill addition, 5 wt % to 25 wt % (preferably 10 to 20 wt %), such that total wt % of glass frit and the mill addition is 100 wt %. It is preferable mean particle size of the addition be less than 5 µm, more preferably less than 1 µm, and most preferably, be less than 0.5 µm.

The sealing glass frits of this invention do not contain $B_2O_3$, and have either no ZnO, or a relatively small amount of ZnO. The sealing glass frits comprise in mole percent of:

| | |
|---|---|
| $SiO_2$ | 70–85 |
| $Al_2O_3$ | 0–5 |
| $Na_2O_3$ | 0–8 |
| $K_2O$ | 10–25 |
| ZnO | 0–10 |
| $ZrO_2$ | 0–6 |
| MgO | 0–7 |
| $TiO_2$ | 0–2. |

It is preferable that the amount of $SiO_2$ in the glass frit be between 72 and 80 mole %. It is preferable that the amount of ZnO in the glass frit be less than 5 mole %, more preferably less than 1 mole %. %. It is preferable that the amount of $Al_2O_3$ in the glass be between 1 and 3 mole %. It is preferable that the amount of $K_2O$ in the glass be between 12 and 20 mole %. It is preferable that the amount of $TiO_2$ in the glass frit is less than 1 mole %, more preferably 0%.

EXAMPLES

The sealing glass frits of this invention will be further clarified by the following three examples, showing glass frit composition in mole percent.

TABLE 1

| | Example 1 | Example 2 | Example 3 |
|---|---|---|---|
| $SiO_2$ | 78.0 | 78.0 | 77.1 |
| $Al_2O_3$ | 2.5 | 2.5 | 2.4 |
| $Na_2O_3$ | 0.0 | 0.0 | 0.4 |
| $K_2O$ | 19.5 | 14.5 | 17.4 |
| ZnO | 0.0 | 0.0 | 0.0 |
| MgO | 0.0 | 5.0 | 2.5 |
| $TiO_2$ | 0.0 | 0.0 | 0.25 |

The data shown in Table 1 is for three exemplary alkali-silicate glass compositions. More specifically, these are potassium-silicate frit glass compositions. After melting, each composition was made into frit by dry ball-milling to a mean particle size of less than 30 µm, for example, 5 µm to 20 µm. The high CTE values and the high softening point required for SOFC sealing material is met by adding an expansion coefficient raising filler to the relatively high viscosity vitreous powdered base glass. Exemplary fillers are an alumina mill, zirconia (CTE≈$120 \times 10^{-7}/°$ C.) or leucite $K_2O$— $Al_2O_3$— $4SiO_2$ (CTE≈$200 \times 10^{-7}/°$C.) addition, 5 wt % to 25 wt %, preferably 5 to 20 wt.

Example 1 frit is essentially $K_2O$— $Al_2O_3$— $SiO_2$, preferably with the tetrasilicate stoichiometty (i.e. $SiO_2$/$K_2O$=4), because reaction of the frit glass with fine alumina addition could result in situ formation of leucite.

The second example is similar in composition to the first example, but has MgO substituted for a portion of potassia. This change resulted in a lower viscosity frit, providing a better flow (than that of Example 1) when frit blends were used at a sealing temperature of 900° C. The glass frit formed by the second exemplary glass composition shown in Table 1 has a softening point at 846° C.

The composition of the third example is similar in composition to the second example, but it has less MgO and it also contains a small amount of $Na_2O_3$ and $TiO_2$. $Na_2O_3$ and $TiO_2$ are used as fillers to lower the softening point of the resulting composition. This third example has substantially lower softening temperature than that of Example 1, and lower viscosity. The glass frit formed by the third exemplary glass composition shown in Table 1 has a softening point at 773° C.

Sealant Blends.

The sealing material comprises alkali-silica-based glass frit in 80 to 95 weight %, and mill addition 5 wt % to 25 wt %, preferably 10 to 20 wt % such that total wt % of glass frit and the mill addition is 100 wt %. It is preferable that the a mean particle size of the addition be less than 30µm, more preferably less than 20 µm and even more preferably less than 10 µm. For example, one may use 90:10 blend (wt % basis), such as 90% powdered glass and 10% Alcoa™ alumina with mean particle size of less than 5 µm and preferably less than 1 µm, in order to facilitate leucite formation. The purpose of alumina addition would be to form a small amount of leucite ($K_2O$—$Al_2O_3$ 13 $4SiO_2$) during sealing to increase the CTE of the overall composition to about 100 to $110 \times 10^{-7}/°C$. These CTE values match CTE values of materials used for fuel cell electrodes, interconnects and support structures. Following the formation of leucite in this blend, the resultant material is crystalline enough that little flow is exhibited until the temperature reaches about 1100° C., thus permitting the seal to be functional at operating temperatures up to 1000° C.

Three exemplary blends were utilized with the glass frit material of Example 1 (Table 1) and are tabulated in Table 2. The first blend comprised comprises glass frit in 80 weight % and 20% zirconia mill addition. The second blend comprised 90 wt % glass frit and 20 wt % leucite mill addition. The third blend comprised 85 wt % glass frit and 15% alumina mill addition. The fourth example of Table 2 comprises frit glass of Example (90 wt %) and leucite (10% wt) addition.

applied to the e-bright substrate and were glossy, clear and strongly adherent following the homogenization process.

The glass frit/alumina blend utilized fine alumina (Alcoa A1000SG, available from Alcola, Pittsburg, Pa.) as a filler, so that leucite could be formed in situ during firing via reaction between glass frit and the filler; $K_2O$—$SiO_2$ (frit)+ α-$Al_2O_3$ (A1000SG)→ $K_2O$ ● $Al_2O_3$●$4SiO_2$ (leucite). The high CTE of the resultant seal confirms that this reaction did indeed occur (during firing).

Figure 4:
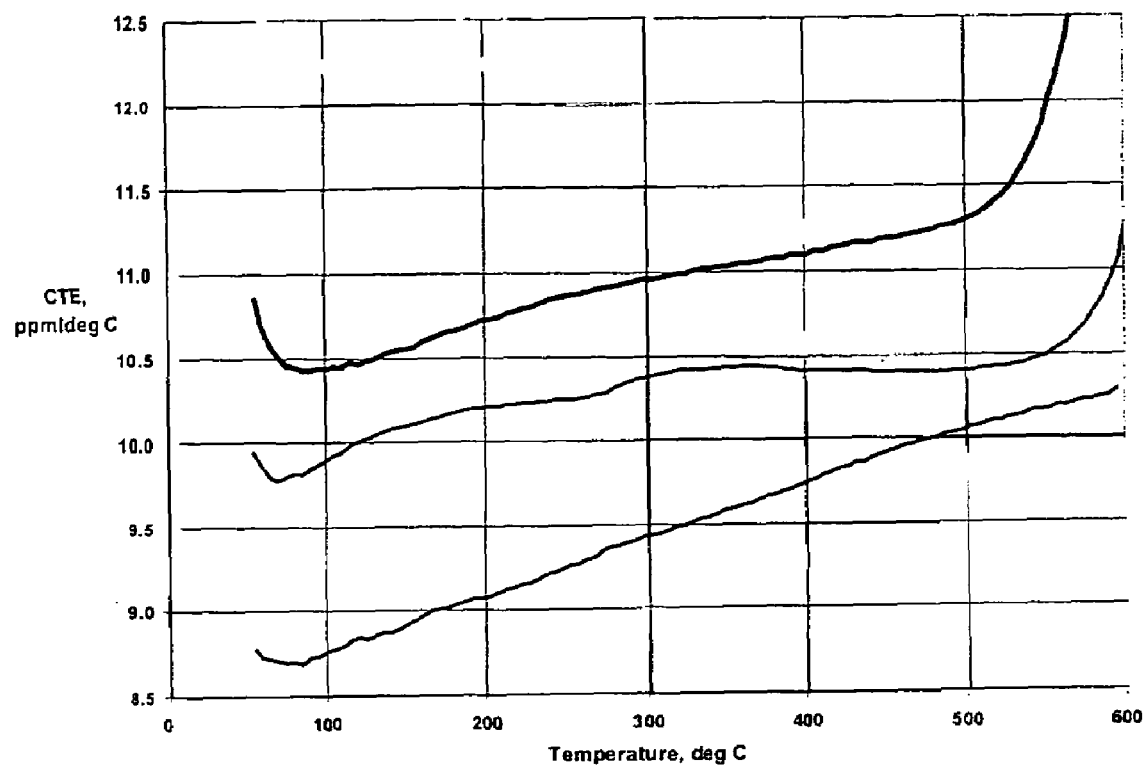
FIG. 4 illustrates the temperature behavior of exemplary glass frit/filler blends.

FIG. 4 illustrates the temperature/CTE behavior of the two of the blends depicted in Table 2 (top two curves). It is noted that these blends have higher CTEs and lower viscosity than that of the sealing material (bottom curve) disclosed in U.S. Pat. No. 6,291,092.

The second composition blend depicted in Table 2 was coated on the E-bright™ substrate and fired at 875° C. for 1 hour in air. It was then exposed to a simulated SOFC environment, forming gas (97% $CO_2$, 3% $H_2$) saturated with steam at 750° C. for 2 hours. The resultant seal formed a

TABLE 2

|  | Glass frit of Ex1/Zirconia | Glass frit of Ex1/Leucite | Glass frit of Ex1/Alumina | Glass frit of Ex3/Leucite |
|---|---|---|---|---|
| Composition wt % | 80 wt %/20 wt % | 90 Wt %/10 wt % | 85 wt %/15 wt % | 90 Wt %/10 wt % |
| Sealing Temperature | 900° C. | 875° C. | 975° C. | 750° C. |
| *CTE, RT to 500° C. | $83 \times 10^{-7}/°C$ | $105 \times 10^{-7}/°C$ | $122 \times 10^{-7}/°C$ | $112.9 \times 10^{-7}/°C$ |

*CTE was measured on sintered samples, the term RT stands for room temperature.

Table 2 shows that all three blends produced a seal at the sealing temperature of less than 1000° C. The glass frit/zirconia blend produced lowest seal CTE values. Thus, if higher seal CTE values are required, some alumina mill addition may also be added to the mix, in the amount required to raise the CTE of the resultant blend to the required levels.

The glass frit/leucite blend had only 10% leucite by wt. Although finely-powdered natural leucite could be used to make this blend, in this exemplary embodiment the leucite source that was added in order to raise the CTE value of the resultant seal was a glass-ceramic (composition in mole %: $Na_2O_3$ 4.7; $K_2O$ 13.0; $Al_2O_3$ 18.0; $SiO_2$ 59.1; $TiO_2$ 5.1). After this (glass-ceramic) composition was melted at the temperatures between 1600° C. to 1650° C., the resultant material was ceramed at 1100° for four hours and then ball-milled to a mean particle size of 10–20 µm. The resultant glass/leucite blends produced the seals at the lowest firing temperatures (i.e., it has the lowest sealing temperatures of 875° C. and 750° C., respectively) of all blends.

When the leucite filler was utilized with the glass frit of the Example 3 of Table 1, the mixture formed strong, adherent glassy coatings and sealed well to high CTE substrates (such as E-brite™ and zirconia, for example) at temperatures as low as 750° C. This sealant is potentially less reducable than the other two sealants because it does not contain XnO. The proper stoichiometry for the glass of Example 3 may also be achieved by slow dissolution and homogenization of the second (i.e. Lucite) blend with potassium silicate water glass (for example, Kasil™ 16 (commercially available from the PQ corporation of Philadelphia, Pa.) by heating at 750° C. The resultant coatings were good interface between the seal and the substrate with no evidence of cracking. The quality of the interface remained unchanged after 200 hour exposure in the simulated SOFC environment.

It is an advantage of the present invention that potassium silicate frit blends form a seal on high CTE substrates for SOFC at temperatures as low as 750° C. These blends offer excellent compatibility with high–Cr stainless steal alloys without the potential for redox reactions and are unaffected following 200 hour exposure at 750° C. in a simulated reducing SOFC environment comprising of forming gas (97% $CO_2$, 3% $H_2$) saturated with steam.

It will be apparent to those skilled in the art that various modifications and variations can be made to the present invention without departing from the spirit and scope of the invention. Thus, it is intended that the present invention covers the modifications and variations of this invention provided they come within the scope of the appended claims and their equivalents.

The invention claimed is:

1. A solid oxide fuel cell device incorporating a sealing material resistant to hydrogen gas permeation at a sealing temperature in the inter-mediate temperature range of 600° C.–800° C., the seal having a CTE in the $100 \times 10^{-7}/°C$ to $120 \times 10^{-7}/°C$, wherein the sealing material comprises in weight %, of:
   (i) a 75 to 95 wt % of glass frit, the glass frit itself comprises in mole %:

| $SiO_2$ | 70–80 |
|---|---|
| $Al_2O_3$ | 1–3 |
| $Na_2O$ | 0–5 |

-continued

| | |
|---|---|
| K$_2$O | 12–20 |
| ZnO | 0–5, |
| ZrO$_2$ | 0–6 |
| MgO | 0–7; and |
| TiO$_2$ | 0–2, | and no Y$_2$O$_3$ or La$_2$O$_3$ or other lanthanides; and (ii) an alumina, zirconia or leucite addition 5 wt % to 25 wt %.

2. The solid oxide fuel cell device according to claim 1 comprising 5 to 20 wt % of alumina, zirconia or leucite addition having mean particle size of less than 5 μm.

3. The solid oxide fuel cell device according to claim 1, wherein the amount of ZnO in the glass frit is less than 1 mole %.

4. A solid oxide fuel cell device incorporating a sealing material resistant to hydrogen gas permeation at a sealing temperature in the inter-mediate temperature range of 600° C.–800° C., the seal having a CTE in the 100×10$^{-7}$/° C. to 120×10$^{-7}$/° C., wherein the sealing material comprises in weight %, of:

(i) a 75 to 95 wt % of glass frit, the glass frit itself consisting in mole percent of:

| | |
|---|---|
| SiO$_2$ | 70–80 |
| Al$_2$O$_3$ | 1–3 |
| Na$_2$O | 0–5 |
| K$_2$O | 12–20 |
| ZnO | 0–5, |
| ZrO$_2$ | 0–6 |
| MgO | 0–7; and |
| TiO$_2$ | 0–2; | and (ii) an alumina, zirconia or leucite addition 5 wt % to 25 wt %.

5. The solid oxide fuel cell device according to claim 4 comprising 5 to 20 wt % of alumina, zirconia or leucite addition having mean particle size of less than 5 μm.

6. The sealing material of claim 4 wherein the amount of ZnO in the glass frit is less than 1 mole %.

* * * * *